United States Patent
Kerr et al.

(10) Patent No.: US 11,384,021 B2
(45) Date of Patent: Jul. 12, 2022

(54) GRAINS FOR THE PRODUCTION OF A SINTERED REFRACTORY PRODUCT, A BATCH FOR THE PRODUCTION OF A SINTERED REFRACTORY PRODUCT, A PROCESS FOR THE PRODUCTION OF A SINTERED REFRACTORY PRODUCT AND A SINTERED REFRACTORY PRODUCT

(71) Applicant: Refractory Intellectual Property GmbH & Co. KG, Vienna (AT)

(72) Inventors: Jacob Kerr, Red Lion, PA (US); Robert O'Brien, New Oxford, PA (US)

(73) Assignee: REFRACTORY INTELLECTUAL PROPERTY GMBH & CO. KG, Vienna (AT)

( * ) Notice: Subject to any disclaimer, the term of this patent is extended or adjusted under 35 U.S.C. 154(b) by 66 days.

(21) Appl. No.: 16/795,910

(22) Filed: Feb. 20, 2020

(65) Prior Publication Data
US 2021/0261464 A1  Aug. 26, 2021

(51) Int. Cl.
*C04B 35/043* (2006.01)
*C04B 35/628* (2006.01)
*C04B 35/64* (2006.01)

(52) U.S. Cl.
CPC .... *C04B 35/0435* (2013.01); *C04B 35/62823* (2013.01); *C04B 35/62897* (2013.01); *C04B 35/64* (2013.01); *C04B 2235/321* (2013.01); *C04B 2235/3206* (2013.01); *C04B 2235/3244* (2013.01); *C04B 2235/442* (2013.01); *C04B 2235/5427* (2013.01)

(58) Field of Classification Search
CPC .......... C04B 35/0435; C04B 35/62823; C04B 35/62897; C04B 35/64; C04B 2235/3206; C04B 2235/321; C04B 2235/3244; C04B 2235/442; C04B 2235/5427; B32B 2264/107; B32B 2264/10
See application file for complete search history.

(56) References Cited

FOREIGN PATENT DOCUMENTS

CN     107162572    *    9/2017

OTHER PUBLICATIONS

CN 107162572 machine translation (Year: 2017).*

* cited by examiner

*Primary Examiner* — Karl E Group
*Assistant Examiner* — Cameron K Miller
(74) *Attorney, Agent, or Firm* — Calfee, Halter & Griswold LLP

(57) ABSTRACT

Grains for the production of a sintered refractory product, a batch for the production of a sintered refractory product, a process for the production of a sintered refractory product and a sintered refractory product.

14 Claims, 2 Drawing Sheets

Figure 1:
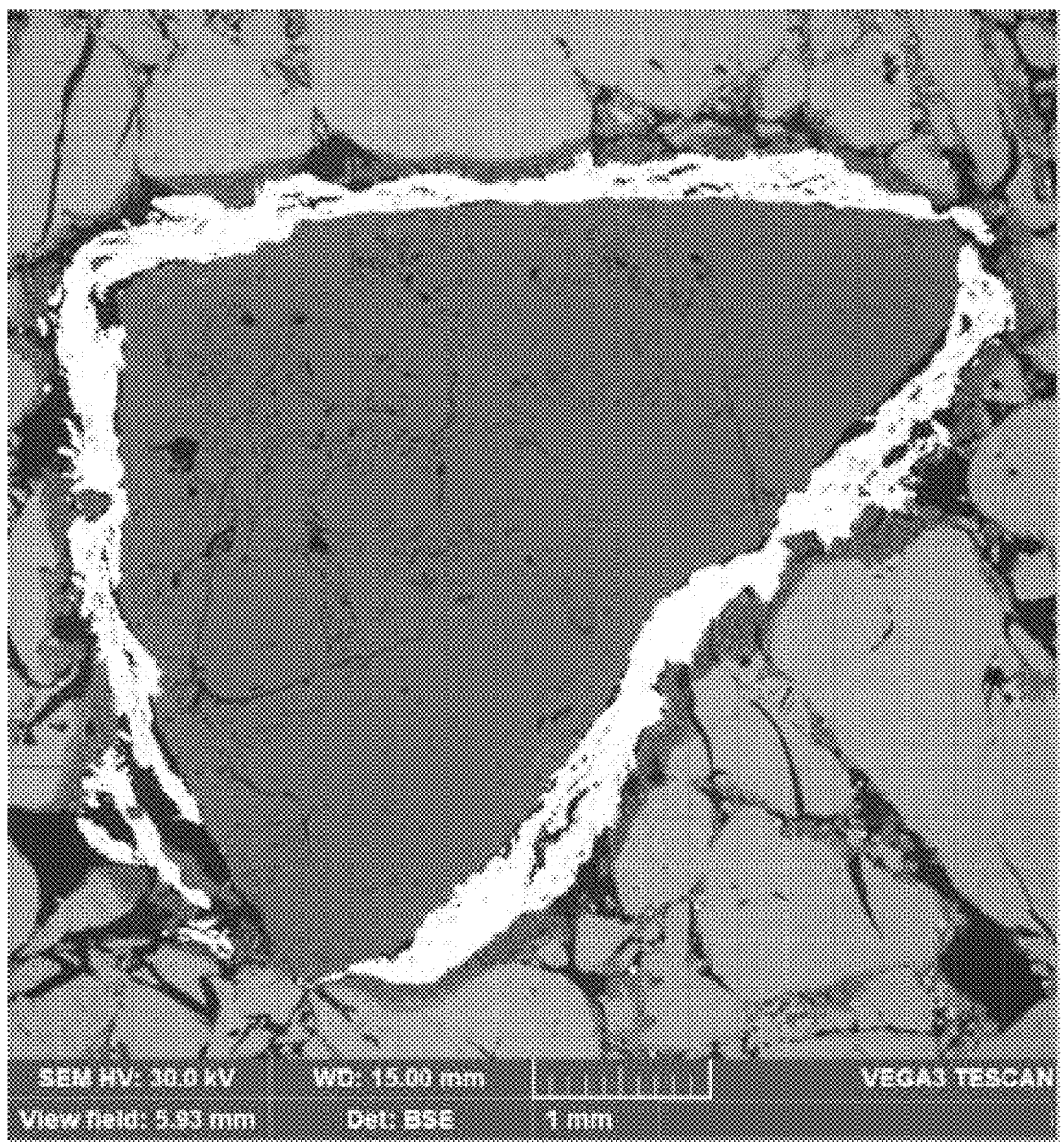

GRAINS FOR THE PRODUCTION OF A SINTERED REFRACTORY PRODUCT, A BATCH FOR THE PRODUCTION OF A SINTERED REFRACTORY PRODUCT, A PROCESS FOR THE PRODUCTION OF A SINTERED REFRACTORY PRODUCT AND A SINTERED REFRACTORY PRODUCT

The invention relates to grains for the production of a sintered refractory product, a batch for the production of a sintered refractory product, a process for the production of a sintered refractory product and a sintered refractory product.

The term "refractory product" in the sense of the invention refers in particular to refractory products with an operating temperature above 600° C. and preferably to refractory products in accordance with DIN 51060: 2006, i.e. materials with a pyrometric cone equivalent >SK17. The pyrometric cone equivalent can be determined in particular in accordance with DIN EN 993-12: 1997-06.

The term "sintered" in the sense of the invention expresses that the refractory product is a ceramic refractory product, i.e. a refractory product consisting of grains sintered together.

According to current practice, a "batch" is a composition of one or more components or raw materials by which a sintered refractory product can be produced by means of a temperature treatment, i.e. in particular by means of firing, for example in a furnace.

Components in a batch for the production of sintered refractory products are regularly available in the form of raw materials based on metal oxides. Such common raw materials for the production of sintered refractory products are, for example, doloma and magnesia. It is well known that doloma is a raw material based on the metal oxides calcium oxide (CaO) and magnesium oxide (MgO). Magnesia is known to be a raw material based on the metal oxide magnesium oxide (MgO). Raw materials in the form of doloma can, for example, be in the form of dead-burned dolomite, synthetic doloma or fused doloma. Raw materials in the form of magnesia can be in the form of sintered magnesia or fused magnesia.

It is well known that sintered refractory products are highly brittle. This brittleness of sintered refractory products manifests itself in a low structural elasticity and a correspondingly high modulus of elasticity of such sintered refractory products. Due to this low structural elasticity, sintered refractory products are highly sensitive to thermal stresses. In particular, such thermal stresses can lead to thermal spalling of refractory products.

In order to improve the structural elasticity of sintered refractory products in relation to thermal stresses, it is known that certain components can be incorporated into sintered refractory products in order to improve the structural elasticity and reduce the modulus of elasticity accordingly.

In order to reduce the modulus of elasticity of sintered refractory products containing calcium oxide, it is known to add a component in the form of zirconia ($ZrO_2$) to the batch used for the production of these products. When firing such a batch, the zirconia reacts in-situ with the calcium oxide of the doloma to form calcium zirconate ($CaZrO_3$). This reaction is expansive or associated with an increase in volume, which causes microcracks to appear in the matrix surrounding the zirconia grains of the product during the firing of the batch. These microcracks improve the structural elasticity and reduce the modulus of elasticity of the product so that thermal spalling of the refractory product is significantly reduced during temperature changes to which the product is subjected.

While this in-situ formation of calcium zirconate, as described above, has a beneficial effect on the structural elasticity of a sintered refractory product, the presence of zirconia in the product may have a detrimental effect on the slag resistance of the product. This is because zirconia can form eutectic phases with iron oxide having a melting point of only 1,323° C., which can significantly reduce the slag resistance of the product. For example; iron oxide may be present in the product as a minor component of components of the batch. In particular, however, iron oxide may also be a component of slags with which the product comes into contact, in particular if the product is used for lining aggregates for holding molten metals.

Furthermore, the use of zirconia is disadvantageous from an economic point of view as the raw material costs for zirconia are relatively high. In general, it can be said that it is known from the state of the art that the structural elasticity of a sintered refractory product comprising calcium oxide can be improved by adding a component in the form of coarse zirconia to the batch for the production of the product. At the same time, however, this can reduce the slag resistance of the product. Furthermore, such a product can only be produced at a higher economic cost.

It is an object of the invention to provide a component for the production of a sintered refractory product, in particular for the production of a sintered refractory product comprising calcium oxide, by which the structural elasticity of the product can be improved without impairing the slag resistance of the product, in particular without substantially reducing it. In particular, it is an object of the invention to provide a component which can be used in a batch for the production of such a product and by which calcium zirconate can be formed in-situ during the firing of the batch to the sintered refractory product, the component, however, not reducing the slag resistance of the product, or at least reducing it to a lesser extent than is the case by the use of zirconia known from the state of the art. Furthermore, it is an object of the invention to provide a component as described above, which can be provided more economically than the state of the art component in the form of zirconia.

It is a further object of the invention to provide a batch comprising such a component.

It is a further object of the invention to provide a process for the production of a sintered refractory product from such a batch.

It is a further object of the invention to provide a sintered refractory product produced by using such a component.

In accordance with the invention, in order to solve the first mentioned object, there is provided a component in the form of grains for the production of a sintered refractory product, the grains comprising the following features:

(1) The grains are made of at least one of the following grains:

Grains made of magnesia, the surface of which have a coating of zirconia at least in sections: or grains made of magnesite, the surface of which have a coating of zirconia at least in sections; or grains made of doloma, the surface of which have a coating of zirconia at least in sections; or grains made of dolomite, the surface of which have a coating of zirconia at least in sections;

the grains have a grain size: of at least 2.8 mm.

Wherein the grains according to (1) may have at least one of the following features according to (2) to (5):

(2) The grains according to (1), wherein the grains have a grain size in the range from 2.8 to 8.0 mm.
(3) The grains according to at least one of (1) to (2), wherein the proportion by weight of the coating of zirconia, in relation to the total weight of the grains, is in the range from 1 to 50% by weight.
(4) The grains according to at least one of (1) to (3), wherein the coating of zirconia has a thickness of at least 10 µm.
(5) The grains according to at least one of (1) to (4), wherein the coating of zirconia has a thickness in the range from 10 to 800 µm.

The features of the grains according to (1) to (5) may be modified as set forth herein. The grains may comprise one or several of the further features as set forth herein. Further, all features of the grains, as set forth herein, may be combined with each other, either individually or in combination.

The invention is based on several surprising, inventive findings.

According to one surprising finding, it was found, in accordance with the invention, that the grains of zirconia known from the state of the art, which are used in the above-mentioned batches in order to improve the structural elasticity or to reduce the modulus of elasticity in the sintered refractory products manufactured from these batches, can be replaced by the grains in accordance with the invention. In contrast to the zirconia grains known from the state of the art, which are completely made of zirconia, the grains according to the invention have a "core" of at least one of the raw materials magnesia, magnesite, doloma or dolomite, whereby the surface of this core has a coating of zirconia at least in sections. In accordance with the invention, it was surprisingly found that the elastifying properties of the grains coated in accordance with the invention were such that an elastifying effect could be reached in a sintered refractory product which was better than the elastifying effect of solid grains of zirconia. At the same time, the grains coated only on their surface with zirconia in accordance with the invention offer the possibility of introducing a lower proportion of zirconia into the sintered refractory product than by a solid grain of zirconia. Further, for the coating of the coated grains according to the invention, pulverized zirconia may be used which can be provided at much lower economic costs than solid grains of zirconia. Further, to the extent that the introduction of zirconia into the product is reduced, the above-mentioned negative effects of zirconia on the slag resistance of the product, in particular by the formation of eutectic phases with a low melting point, is also reduced.

In addition, it was surprisingly found, in accordance with the invention, that the above-mentioned beneficial effects of the coated grains in terms of improved microstructural elasticity and reduced modulus of elasticity occur particularly only when the coated grains have a grain size of at least 2.8 mm. What this effect is based on has not been clarified in detail. The inventors suspect that the elastifying effect of the coated grains according to the invention is particularly noticeable only from a grain size of at least 2.8 mm. Furthermore, the inventors suspect that (with a constant thickness of the zirconia coating on the coated grains in accordance with the invention) from a grain size of the coated grains of at least 2.8 mm the mass ratio of zirconia to the core of the coated grains shifts in favour of the mass fraction of the core in such a way that only from a grain size of at least 2.8 mm do the coated grains permit the low proportion of zirconia in the product in accordance with the invention to be realised with a simultaneous sufficiently elastifying effect of the coated grains.

The inventive grains having the inventive coating of zirconia are hereinafter referred to as "coated grains".

The fact that the coated grains in accordance with the invention are used "for the production" of a sintered refractory product means that the grains can be used in the context of a technology for the production of a sintered refractory product. In particular, the coated grains, as set forth herein, may be used in a batch for the production of a sintered refractory product, and the coated grains, as set forth herein, may be present in such a batch together with other components.

"Grains of magnesia" within the meaning of the invention means grains of the raw material magnesia, i.e. a material consisting essentially of magnesium oxide (MgO). Such a raw material in the form of magnesia may be present in particular in the form of at least one of the raw materials sintered magnesia or fused magnesia.

"Grains of magnesite" within the meaning of the invention means grains of the raw material magnesite, i.e. a material consisting essentially of magnesium carbonate ($MgCO_3$). Such a raw material in the form of magnesite may be present in particular in the form of raw magnesite, i.e. non-calcined magnesite.

"Grains of doloma" within the meaning of the invention means grains of the raw material doloma, i.e. a material consisting essentially of magnesium oxide (MgO) and calcium oxide (CaO). Such a raw material in the form of doloma may be present in particular in the form of at least one of the raw materials dead-burned dolomite, sintered doloma or fused doloma.

"Grains of dolomite" in the meaning of the invention means grains of the raw material dolomite, i.e. a material consisting essentially of magnesium carbonate ($MgCO_3$) and calcium carbonate ($CaCO_3$). Such a raw material in the form of dolomite may be present in particular in the form of raw dolomite, i.e. non-calcined dolomite.

"zirconia" in the meaning of the invention refers to a material which essentially consists of zirconium oxide ($ZrO_2$). Such a raw material in the form of zirconia may be present in particular in the form of at least one of the raw materials zirconia, baddeleyite, fused zirconia, calcia stabilized zirconia or magnesia stabilized zirconia.

In accordance with the invention, the coated grains were found to have their best elastifying effect with only a small amount of zirconia being introduced into the sintered refractory product when the coated grains have a grain size in the range from 2.80 to 6.63 mm. According to a preferred embodiment it is therefore provided that the coated grains have a grain size of at most 8.0 mm and even more preferably a grain size of at most 6.63 mm. According to a preferred embodiment it is provided that the coated grains have a grain size in the range from 2.8 to 8.0 mm and even more preferably a grain size in the range from 2.80 to 6.63 mm.

The coated grains have a core of magnesia, magnesite, doloma or dolomite, the surface of which is at least partially coated with zirconia.

The fact that the coated grains have the coating of zirconia at least in sections indicates that the grains are either completely or only in sections coated with zirconia. If the coated grains have a zirconia coating not only in sections but completely, the zirconia completely surrounds the core of the grains, i.e. the core of magnesia, magnesite, doloma or dolomite of the grains, i.e. like a shell in which the magnesia, magnesite, doloma or dolomite lies like a core. If the zirconia surrounds the core of magnesia, magnesite, doloma or dolomite only in sections, the zirconia coating may, for example, have gaps or cracks, or the zirconia coating may only be partially arranged on the grains, for example in the form of separate sections or areas. The coated grains preferably have a zirconia coating over at least 50% of the surface area. In other words, magnesia, magnesite, doloma or dolomite have a zirconia coating on at least 50% of their surface. However, the coated grains preferably have a complete coating of zirconia. In accordance with the invention, it has been found that in particular such grains completely coated with zirconia with a core of magnesia, magnesite, doloma or dolomite have a particularly strong elastifying effect in the sintered refractory product.

According to the invention, it was found that the elastifying effect of coated grains of magnesite and dolomite; the surface of which is at least in sections coated with zirconia, is slightly lower than the elastifying effect of coated grains of magnesia or doloma, the surface of which is at least in sections coated with zirconia. The coated grains are therefore preferably in the form of at least one of the following grains: Grains of magnesia whose surface is at least in sections coated with zirconia; or grains of doloma whose surface is at least in sections coated with zirconia. Furthermore, it was determined in accordance with the invention that the elastifying effect of coated grains of magnesia, the surface of which is at least in sections coated with zirconia, is slightly lower than the elastifying effect of coated grains of doloma, the surface of which is at least in sections coated with zirconia. The coated grains are therefore particularly preferred in the form of doloma grains whose surface is at least in sections coated with zirconia.

The "grain size" of the coated grains within the meaning of the invention is determined according to DIN 66165-2:2016-08.

The core of the coated grains of magnesia consists predominantly of magnesia (MgO), the core of the coated grains of doloma consists predominantly of magnesia (MgO) and calcium oxide (CaO), and the core of the coated grains of dolomite consists predominantly of magnesium carbonate ($MgCO_3$) and calcium carbonate ($CaCO_3$), whereby, in addition to these main substances, the usual secondary oxides and impurities, which raw materials usually contain, may be present. In this respect, the coated grains with a core of magnesia may contain secondary oxides in the form of CaO, $SiO_2$, $Al_2O_3$ or $Fe_2O_3$ and the coated grains with a core of doloma or dolomite may contain secondary oxides in the form of $SiO_2$, $Al_2O_3$ or $Fe_2O_3$. However, these secondary oxides or impurities are preferably present in a proportion of less than 10% by mass, based on the mass of the cores of the coated grains.

The coating of zirconia, which the coated grains each contain, consists of zirconia ($ZrO_2$) and may contain the usual secondary oxides and impurities in addition to the pure oxide $ZrO_2$, e.g. secondary oxides in the form of CaO, $SiO_2$, $Al_2O_3$ or $Fe_2O_3$. In addition, the coating has the usual secondary oxide $HfO_2$, which is usually associated with $ZrO_2$. Preferably, however, these secondary oxides are present in a proportion of less than 10% by mass, based on the mass of the coating of the coated grains.

According to the invention, it has been found that the coated grains can develop their elastifying effect particularly advantageously if the coating is present in a mass fraction of at least 1% by mass, based on the total mass of the coated grains. Furthermore, it has turned out, in accordance with the invention, that the amount of zirconia in the sintered refractory product due to the coated grains may become too high if the coated grains have the zirconia coating in a proportion by mass of more than 50%. Therefore, it is preferable, in accordance with the invention, that the mass fraction of the coating of zirconia of the coated grains should be in the range of 1 to 50% by mass. Furthermore, it has turned out, in accordance with the invention, that the coated grains can fulfil their elastifying effect particularly advantageously if the coated grains have the coating in a proportion of 20% by mass and at the same time only the smallest possible input of zirconia into the sintered refractory product. According to the invention, it may therefore be provided that the mass fraction of the zirconia coating of the coated grains is as close as possible to this fraction. Preferably, it may therefore be provided that the mass fraction of the zirconia coating of the coated grains is at least 5% by mass, even more preferred at least 10% by mass and even more preferred at least 15% by mass. Furthermore, according to the invention, it may be provided that the mass fraction of the zirconia coating of the coated grains is at most 45% by mass, even more preferably at most 30% by mass and even more preferably at most 25% by mass. Accordingly, according to the invention, it may be preferably provided that the mass fraction of the zirconia coating of the coated grains is in the range of 5 to 45% by mass, even more preferably in the range of 10 to 30% by mass and even more preferably in the range of 15 to 25% by mass. The mass specifications given above for the mass fraction of the zirconia coating of the coated grains are based in each case on the total mass of the coated grains.

It is preferred that at least 50% by mass and even more preferably at least 90% by mass of the coated grains, in each case relative to the total mass of the coated grains, have the aforementioned mass proportions of the zirconia coating.

In accordance with the invention, it was found that the zirconia coating of the coated grains from a layer thickness of about 10 μm is particularly capable of forming calcium zirconate with calcium oxide either from further components of the batch in which the coated grains are present or from the core of the coated grains. Thus, according to a preferred embodiment, the zirconia coating is intended to have a thickness of at least 10 μm. In addition, it was found in accordance with the invention that from a thickness of the zirconia coating of above 800 μm, the entire zirconia may no longer react with calcium oxide to form calcium zirconate, so that after firing of the product not inconsiderable portions of the zirconia coating could remain in the product and, as explained above, impair the hot properties of the product. Therefore, according to an embodiment it is intended that the zirconia coating should have a thickness of at least 10 μm and more preferably a thickness in the range of 10 to 800 μm. In accordance with the invention, it was found that the optimum thickness of the zirconia coating is in the range from 60 to 500 μm, since at such a thickness sufficient zirconia can be provided to form calcium zirconate and at the same time only small or no portions of the zirconia coating can remain in the sintered refractory product. According to a preferred embodiment it is therefore intended that the zirconia coating should have a thickness of at least 20 μm, even more preferably of at least 40 μm and even more preferably of at least 60 μm. It may also be preferred that the zirconia coating has a thickness of not more than 800 μm, more preferably not more than 600 μm and more preferably not more than 500 μm. According to a preferred embodiment, the zirconia coating is intended to have a thickness ranging from 20 to 700 μm, even more preferably ranging from 40 to 600 μm and even more preferably ranging from 60 to 500 μm.

It is preferred that each coated grain has a zirconia coating thickness as above, preferably at least 50% of the coated grains, more preferably at least 90% of the coated grains, each based on the total mass of the coated grains.

The coating of zirconia of the coated grains is particularly preferred in the form of powder, i.e. in the form of fine particles. In particular, the zirconia of the coating of the coated grains is not sintered. Such a coating of the coated grains in the form of zirconia powder has in particular the advantage of a high reactivity of the zirconia, so that it can react particularly advantageously in-situ with calcium oxide to calcium zirconate during firing.

In order to improve the adhesion of such a zirconia powder coating to the coated grains, the zirconia powder may be applied to the surface of the coated grains via an adhesion promoter, e.g. an adhesion promoter in the form of water or binder. A particularly preferred type of coating is zirconia in the form of zirconia powder, which is bound by an organic binder. The organic binder can in particular be a temporary binder, which burns out or evaporates when a batch comprising the coated grains is fired. In this respect, the temporary binders known from the state of the art can be used, for example an aqueous solution of polyvinyl alcohol.

The zirconia powder is preferably particularly fine in the coating or has a small grain size. According to a preferred embodiment, zirconia is present in the coating of zirconia of the coated grains to at least 90% by mass, even more preferably to at least 97% by mass and even more preferably to at least 99% by mass in a grain size below 45 µm (325 mesh), in each case relative to the total mass of zirconia in the coating of zirconia.

An object of the invention is also a process for preparing the coated grains according to the invention, said process comprising the following steps:
Providing grains, said grains consisting of at least one of the following grains:
  grains of magnesia; or
  grains of magnesite; or
  grains of doloma; or
  grains of dolomite; wherein
  the grains have a grain size of at least 2.8 mm;
  providing zirconia;
  coating the surface of the grains, at least in sections, with the zirconia.

The features of the process may be modified as set forth herein. The process may comprise one or several of the further features as set forth herein. Further, all features of the process, as set forth herein, may be combined with each other; either individually or in combination.

The grains made available for carrying out the process are hereinafter referred to as "grains to be coated".

The grains to be coated provided for the process may have the grain size of the coated grains indicated above. Furthermore, the grains to be coated may have the chemical composition of the cores of the coated grains described above.

The zirconia used in the process may have the grain size and chemical composition of the zirconia of the coated grains described above.

The grains to be coated are preferably coated with zirconia in such a way as to obtain a coating thickness equal to the thickness of the zirconia coating of the coated grains. For this purpose, the grains to be coated can be mixed with the zirconia. Preferably, the grains to be coated and the zirconia are mixed in a mixer, preferably in a compulsory mixer. The grains to be coated and the zirconia are preferably mixed together for such a period that the grains to be coated are coated with the zirconia in such a thickness that the thickness of the coating corresponds to the thickness of the zirconia coating of the coated grains.

Furthermore, to coat the grains to be coated with the zirconia, the grains to be coated and the zirconia are preferably mixed together with a binder, preferably an organic binder, especially preferred with a temporary binder, as described above.

The proportion of binder by mass, relative to the total mass of the grains to be coated without the binder, can, for example, be between 1 and 2% by mass.

The zirconia, as described above, is preferably provided as powder, in particular as dry powder, especially with the grain size of the zirconia of the coated grains described above.

The grains to be coated are preferably coated with such a proportion of zirconia that the mass proportion of the coating of zirconia, in relation to the total mass of the grains to be coated with the coating applied thereto, is present in a mass proportion corresponding to the mass proportion of the above-mentioned coating of zirconia of the coated grains.

The invention also refers to the following:
(6) A batch for the production of a sintered refractory product, the batch comprising the coated grains according to the invention.
Wherein the batch according to (6) may have at least one of the following features according to (7) to (13):
(7) The batch according to (6), comprising at least 1% by weight of the grains, in relation to the total weight of the batch.
(8) The batch according to at least one of (6) to (7), comprising 1 to 15% by weight of the grains, in relation to the total weight of the batch.
(9) The batch according to at least one of (6) to (8), comprising at least one calcium oxide comprising component.
(10) The batch according to at least one of (6) to (9), wherein the at least one calcium oxide comprising component is at least one of the following calcium oxide comprising components: Doloma or dolomite.
(11) The batch according to at least one of (6) to (10), wherein the at least one calcium oxide comprising component is present in the form of grains.
(12) The batch according to at least one of (6) to (11), wherein the batch is a batch for the production of a sintered refractory dolomite product.
(13) The batch according to at least one of (6) to (12), wherein the batch has a chemical composition with MgO in the range from 38 to 90% by mass and with CaO in the range from 8 to 60, the remainder being $ZrO_2$, $SiO_2$, $Fe_2O_3$ and $Al_2O_3$.

The chemical composition is determined in accordance with DIN EN ISO 12677:2013.

The features of the batch according to (8) to (13) may be modified as set forth herein. The batch may comprise one or several of the further features as set forth herein. Further, all features of the batch, as set forth herein, may be combined with each other, either individually or in combination.

In accordance with the invention, it has been found that the coated grains in accordance with the invention can develop their elastifying effect in a sintered refractory product to be produced from a batch to a particular degree if they are present in an amount of at least 1% by mass in the batch. In this respect, it is provided, according to a preferred embodiment, that the batch in accordance with the invention comprises the coated grains in a proportion of at least 1% by mass. Furthermore, it has been found, in accordance with the invention, that too much zirconia can be incorporated into the sintered refractory product to be produced from the batch by the coated grains according to the invention, if the batch comprises the coated grains according to the invention in a proportion of more than 15% by mass. To this extent, it is provided, in a preferred form, that the batch comprise the coated grains according to the invention in a proportion by mass ranging from 1 to 15%. In this respect, a proportion of the coated grains in the batch according to the invention of 3% by mass has proved to be optimal. In this respect, according to a preferred embodiment, it may be provided that the batch according to the invention comprises the coated grains in a proportion in the range of 1 to 10% by mass, even more preferably in a proportion in the range of 1 to 8% by mass, even more preferably in a proportion in the range of 1 to 6% by mass and even more preferably in a proportion in the range of 2 to 4% by mass. The premade data in % by mass is in each case related to the total mass of the batch.

In addition to the coated grains, the invention may include a refractory base material. This refractory base material may consist, in particular, of one or more components which may include the known prior art batches for the production of a sintered refractory product.

The components of the refractory base material may consist of one or more non-metallic inorganic materials which, when subjected to temperature, sinter together to form a sintered, i.e. ceramic, refractory product.

Preferably the refractory base material or the components of the refractory base material are present in the form of grains, preferably in grain sizes in the range of >0 to 8 mm.

The refractory base material is preferably available in the form of a basic refractory base material, i.e. it consists of one or more basic components. As is well known, "basic" refractory components are those based on at least one of the oxides calcium oxide (CCC) and magnesium oxide (MgO).

Particularly preferably, the batch or refractory base material as such a basic component comprises at least one component comprising calcium oxide. Calcium zirconate may be formed in-situ from the calcium oxide of such a component and the zirconia of the zirconia coating of the coated grains during the firing of the batch. The component comprising at least one calcium oxide may comprise the calcium oxide, for example as bound calcium oxide, for example in the form of calcium carbonate ($CaCO_3$). However, the component comprising calcium oxide particularly preferentially comprises calcium oxide in free form. According to a particularly preferred embodiment, the component comprising at least one calcium oxide is present in the form of at least one of the following components comprising calcium oxide: Doloma or dolomite. The component comprising calcium oxide in the form of doloma is particularly preferred. Doloma may preferably be in the form of at least one of the following components: Sintered doloma or fused doloma.

In addition to the components comprising at least one calcium oxide, the refractory base material may preferably comprise as a further basic component at least one component comprising magnesium oxide. According to a preferred embodiment, the component comprising at least one magnesium oxide is in the form of magnesia. Magnesia may preferably be in the form of at least one of the following components: Sintered magnesia or fused magnesia.

In accordance with the above preferential proportions of the coated grains in the batch according to the invention, the batch according to the invention comprises refractory base material preferably in a proportion in the range of 85 to 99% by mass, more preferably in a proportion in the range of 90 to 99% by mass, more preferably in a proportion in the range of 92 to 99% by mass, more preferably in a proportion in the range of 94 to 99% by mass and more preferably in a proportion in the range of 96 to 98% by mass, each based on the total mass of the batch.

The refractory base material shall preferably consist of one or more basic components, in particular basic components in the form of components comprising calcium oxide and magnesium oxide as specified above. According to a preferred embodiment it is intended that the refractory base material consists of one or more of the basic components and consists of at least 50% by mass, more preferably at least 70% by mass, of one or more of the basic components in the form of the components comprising calcium oxide mentioned above.

According to a preferred embodiment, the batch is provided such that it can be used for the production of a sintered refractory dolomite product. As is well known, a refractory "dolomite" product actually is not a based on "dolomite", but on "doloma", i.e. on the basis of the oxides MgO and CaO. Preferably, the batch has a chemical composition with MgO in the range from 38 to 90% by mass and with CaO in the range from 8 to 60, with the remainder up to 100% by mass being one or more of the oxides $ZrO_2$, $SiO_2$, $Fe_2O_3$ and $Al_2O_3$. Preferably, the total mass of MgO and CaO is at least 96% by mass. The premade data in % by mass is in each case related to the total mass of the batch.

In addition to the coated grains and the refractory base material, the batch according to the invention may also comprise at least one clay, in particular at least one bonding clay, as a further component. In particular, such a bonding clay may be used to improve the sintering properties of the batch. The batch according to the invention can, for example, comprise such a clay in a proportion in the range from >0 to 2% by mass, in particular in a proportion in the range from 0.1 to 2% by mass, in each case relative to the total mass of the batch.

The invention also refers to a process for producing a sintered refractory product, the process comprising the following steps:
Providing a batch according to the invention;
firing the batch to produce a sintered refractory product.

The features of the process may be modified as set forth herein. The process may comprise one or several of the further features as set forth herein. Further, all features of the process, as set forth herein, may be combined with each other, either individually or in combination.

The batch according to the invention provided for carrying out the process according to the invention is preferably mixed before firing, preferably in a mixer, particularly preferred in a compulsory mixer. A binder, in particular an organic binder, especially a temporary organic binder, may be added to the batch during the mixing of the batch. In this respect, temporary binders known from the state of the art can be used in particular to bind the batch for the production of a sintered refractory product. For example, the batch can be mixed with a temporary binder, for example a non-aqueous organic binder. Preferably, the batch is mixed with a binder in a proportion in the range of 1 to 2% by mass, based on the total mass of the batch without the binder.

The batch, possibly mixed and possibly with a binder, can then be formed, preferably by pressing, preferably at a pressure in the range of 70 to 200 MPa. For example, the batch can be pressed into a shaped, unfired body in the form of a so-called green body.

The batch, which may be shaped, can then be fired in such a way that the components of the batch, in particular the coated grains and the components of the refractory base material, sinter together to form a sintered refractory product. In this respect, the firing is a so-called ceramic firing, in which a sintered, i.e. ceramic, refractory product is fired from the batch. The temperature and duration of the firing shall be chosen by the skilled person in such a way that such a sintered refractory product is fired from the batch. The appropriate firing conditions can be easily set by the skilled person. According to the invention, firing temperatures in the range of 1,450 to 1,600° C. can be provided. Furthermore, according to the invention, a burning time in the range of 4 to 8 hours (at the above range of temperatures) may be preferred.

As explained above, the zirconia of the coating of the coated grains reacts in-situ with calcium oxide during firing. This calcium oxide may, for example, be present as a minor component of one of the components of the batch. However, calcium oxide is particularly preferred as a component of at least one of the components of the refractory base material, in particular the at least one component comprising calcium oxide. The zirconia of the coating reacts in-situ with the calcium oxide to form calcium zirconate during firing. This is associated, as stated above, with an increase in volume, as a result of which microcracks are formed in the sintered refractory ceramic product produced by the firing during the firing of the batch, as a result of which the brittleness of the product decreases and its microstructural elasticity increases. This is indicated by a reduced modulus of elasticity of the product.

An object of the invention is also a sintered refractory product comprising the following features:

The product comprises grains, which are sintered together;
  the grains comprise first grains and second grains, wherein
  the first grains comprise calcium oxide comprising grains, wherein
  the second grains are at least one of the following grains:
  Magnesia grains, the surface of which have a coating of calcium zirconate at least in sections; or
  magnesite grains, the surface of which have a coating of calcium zirconate at least in sections; or
  doloma grains, the surface of which have a coating of calcium zirconate at least in sections; or
  dolomite grains, the surface of which have a coating of calcium zirconate at least in sections; and wherein
  the second grains have a grain size of at least 2.8 mm.

The features of the sintered refractory product may be modified as set forth herein. The sintered refractory product may comprise one or several of the further features as set forth herein. Further, all features of the sintered refractory product, as set forth herein, may be combined with each other, either individually or in combination.

This sintered refractory product according to the invention is preferably produced by the aforementioned process according to the invention. The coated grains of the batch according to the invention form the second grains and the components of the refractory base material of the batch according to the invention form the first grains.

Accordingly, the first grains shall preferably consist of a basic material. The first grains preferably comprise calcium oxide comprising grains.

The first grains may preferably be in the form of grains of doloma or in the form of grains of doloma and magnesia. At least 50% by mass or more preferably at least 70% by mass of the first grains may be in the form of grains of doloma, relative to the total mass of the first grains.

The first grains may be present in the product in a proportion by mass corresponding to the proportion by mass of the refractory base material in the batch according to the invention. Accordingly, the product according to the invention comprises first grains preferably in a proportion in the range from 85 to 99% by mass, even more preferably in a proportion in the range from 90 to 99% by mass, even more preferably in a proportion in the range from 92 to 99% by mass, even more preferably in a proportion in the range from 94 to 99% by mass and even more preferably in a proportion in the range from 96 to 98% by mass, in each case relative to the total mass of the product.

The second grains may preferably have the grain size of the coated grains according to the invention. Accordingly, it may be preferred that the second grains have a grain size of at least 2.80 mm and also a grain size of not more than 8.0 mm and more preferably a grain size of not more than 6.63 mm. According to one embodiment it is provided that the second grains have a grain size in the range from 2.80 to 8.0 mm and even more preferably a grain size in the range from 2.80 to 6.63 mm.

The calcium zirconate coating of the second grains may have a thickness corresponding to the thickness of the zirconia coating of the coated grains according to the invention. It may be provided that the calcium zirconate coating of the second grains has a somewhat larger thickness than the thickness of the zirconia coating of the coated grains according to the invention as the zirconia coating of the second grains may grow during firing. It may be preferably provided that the calcium zirconate coating has a thickness of at least 10 μm, even more preferentially of at least 40 μm, even more preferentially of at least 60 μm and even more preferentially of at least 100 μm. It may also be preferred that the calcium zirconate coating has a thickness of not more than 800 μm, more preferably of not more than 700 μm and even more preferably of not more than 600 μm. According to a preferred embodiment, the calcium zirconate coating is provided to have a thickness in the range from 10 to 800 μm, more preferably in the range from 40 to 700 μm, more preferably in the range from 60 to 600 μm and more preferably in the range from 100 to 600 μm.

The second grains may be present in the product in a proportion by mass corresponding to the proportion by mass of the coated grains in the batch according to the invention. Accordingly, the product according to the invention comprises the second grains preferably in a proportion in the range from 1 to 15% by mass, even more preferably in a proportion in the range from 1 to 10% by mass, even more preferably in a proportion in the range from 1 to 8% by mass, even more preferably in a proportion in the range from 1 to 6% by mass and even more preferably in a proportion in the range from 2 to 4% by mass, in each case relative to the total mass of the product.

In the sintered refractory product, the first grains may preferably form a matrix in which the second grains are embedded. The calcium zirconate coating may be arranged like a shell around the second grains, the second grains being in contact with the matrix of the product, in particular with the first grains, via this calcium zirconate coating.

The calcium zirconate coating acts as an elasticizer in the sintered refractory product, increasing the structural elasticity of the product and reducing its brittleness. This is particularly evident in the low modulus of elasticity of the product.

At the same time, the invention allows only a small proportion of zirconia to be incorporated into the product despite the presence of calcium zirconate, since the second grains do not have a zirconia core but a magnesia, magnesite, doloma or dolomite core. As explained above, this is what makes the product according to the invention having such a good slag resistance, since the second grains introduce only very small quantities of zirconia into the product. In this respect, the product according to the invention may have both good hot properties and good microstructural elasticity.

It is preferable that the proportion of zirconia in the sintered refractory product according to the invention is less than 1% by mass of the total mass of the product.

In addition, the sintered refractory product according to the invention may have a modulus of elasticity of less than 110 GPa and more preferably less than 100 GPa. The modulus of elasticity is determined according to standard DIN EN ISO 12680-1:2007.

The sintered refractory product according to the invention is particularly preferably characterised by a proportion of zirconia of less than 1% by mass and a modulus of elasticity as described above.

The sintered refractory product shall preferably have second grains in the form of at least one of the following grains: Magnesia grains whose surface has, at least in sections, a coating of calcium zirconate or doloma grains whose surface has, at least in sections, a coating of calcium zirconate, since these grains can improve the microstructural elasticity particularly well. In particular, the sintered refractory product according to the invention has second grains in the form of doloma grains, the surface of which has, at least in sections, a coating of calcium zirconate, since these grains can improve the structural elasticity to the best extent.

In accordance with the invention, it has been found that the product according to the invention is particularly suitable for the lining of aggregates for holding a metal melt, in particular a steel melt. This applies in particular where the product is made from a batch whose refractory base material consists of basic components and, accordingly, where the first grains of the product consist of basic material. In this respect, the object of the invention is also the use of the product in accordance with the invention for the lining of aggregates for holding a metal melt, in particular a steel melt. In this respect, the object of the invention is also an aggregate for holding a molten metal, in particular molten steel, having a lining of the products according to the invention.

Further features of the invention result from the claims and the exemplary embodiments of the invention described below.

All features of the invention may be combined with each other in any form, either individually or in combination.

Exemplary embodiments of the invention are explained in more detail below.

In the exemplary embodiments of the invention and the comparative examples, the chemical composition is determined according to the standard DIN EN ISO 12677:2013, the grain size is determined according to DIN 66165-2: 2016-08, the grain size of the zirconia powder is determined according to DIN 66165-2:2016-08 and the modulus of elasticity is determined according to the standard DIN EN ISO 12680-1:2007.

EXEMPLARY EMBODIMENT 1

Example Process for the Production of Coated Grains

Grains of magnesia, with grain sizes ranging from 2.80 to 6.63 mm, were first provided for the execution of the process.

The magnesia grains had the following chemical composition, relative to the total mass of the magnesia grains:
MgO: 98.4% by mass
CaO: 0.8% by mass
$Fe_2O_3$: 0.5% by mass
$Al_2O_3$: 0.1% by mass
$SiO_2$: 0.1% by mass
$Mn_2O_3$: 0.1% by mass A zirconia powder was also provided. The zirconia powder had the following chemical composition, based on the total mass of the zirconia powder:
$ZrO_2$: 92.5% by mass
$HfO_2$: 2.0% by mass
CaO: 2.6% by mass
$Fe_2O_3$: 0.1% by mass
$Al_2O_3$: 1.9% by mass
$SiO_2$: 0.9% by mass The zirconia powder was 99.5% by mass, relative to the total mass of the zirconia powder, in a grain size of less than 45 μm (325 mesh).

The grains of magnesia were put into a mixer and the mixer was started. A quantity of 1.5% by mass of a binder, based on the total mass of the grains of magnesia without the binder, was then added to the grains of magnesia in the mixer. The binder consisted of an aqueous solution of polyvinyl alcohol.

The zirconia powder was then slowly added to the magnesia grains prepared with the binder in the mixer. As a result, a zirconia coating was formed from the magnesia grains. This addition of zirconia powder to the mixer was continued until coated grains with a mass ratio of 80% by mass magnesia to 20% by mass zirconia were reached. The thickness of the zirconia coating on the magnesia grains was about 80-250 μm, Example of the Coated Grains The previously described example of a process for the production of coated grains resulted in coated grains of magnesia, the surface of which was completely coated with a zirconia coating. At the 80-250 μm thickness of the zirconia coating obtained, the mass fraction of the zirconia coating was about 20% by mass, relative to the total mass of the coated grains. In other words, the process produced coated grains that had a core of magnesia and were completely coated on their surface with a zirconia coating. The mass ratio of this core to the coating was 80% by mass to 20% by mass.

Example of a Batch

An exemplary embodiment of a batch according to the invention was produced, which included the coated grains according to the above exemplary embodiment.

These coated grains were mixed with a refractory base material, bonding clay and a binding agent to form a batch.

The refractory base material consisted exclusively of basic components in the form of sinter doloma and sinter magnesia. The sinter doloma and the sinter magnesia were each provided with grain sizes in the range of >0 to 6.63 mm.

The binder was in the form of a temporary organic binder in the form of a non-aqueous organic binder.

The components, with the exception of the binder, were put into a mixer in the following proportions by mass, in each case relative to the total mass of the batch, to form a batch:
Coated grains: 4% by mass
Doloma: 86% by mass
Magnesia: 9.6% by mass
Bonding clay: 0.4% by mass.

Subsequently, the binder was added to the batch in a proportion of 2% by mass, based on the batch without the binder.

The components were then mixed in the mixer to form a batch.

Example of a Process for the Production of a Sintered Refractory Product

The batch obtained after mixing was removed from the mixer and pressed in a press at a pressure of 100 MPa. A green body was then obtained.

The green body or the pressed batch was then fired at a temperature of 1,450° C. for 8 hours.

During firing, the components of the batch sintered together to form a sintered, i.e. ceramic, refractory product.

Furthermore, during firing, the zirconia coating of the coated grains reacted in-situ with the calcium oxide of the doloma grains to form calcium zirconate. As this reaction was associated with an increase in volume, it led to microcracks in the structure of the product during firing.

After firing, the product was in the form of a sintered refractory according to the invention.

This product had the first sintered grains in the form of grains of sintered doloma and sintered magnesia. These first grains were formed from the grains of the components of the refractory base material.

There were also second grains in the product which had formed from the coated grains. These second grains were in the form of grains of magnesia, each with a coating of calcium zirconate. The thickness of this calcium zirconate coating was somewhat larger than the thickness of the zirconia coating on the coated grains, i.e. about 100-300 µm.

The microstructure of the sintered refractory product had a matrix of sintered first grains in which the second grains were embedded.

The modulus of elasticity of the product was determined to be 88.0 GPa.

At the same time, the chemical content of $ZrO_2$ in the product was 0.7% by mass, relative to the total mass of the product. This is expected to result in good resistance to slags rich in FeO of the product.

COMPARATIVE EXAMPLES

Comparative Example 1

For the purposes of comparison, a sintered refractory product was produced which differed from the product produced according to the exemplary embodiment in that the coated grains were replaced by zirconia grains which had the grain size in the range from 0.6 to 3.35 mm, and wherein the product was made from the following batch:
Zirconia grains: 0.87% by mass
Doloma: 89.13% by mass
Magnesia: 9.6% by mass
Bonding clay: 0.4% by mass.

The sintered refractory product obtained had only a modulus of elasticity of 91.3 GPa. However, this product had a chemical zirconia content of 0.8% by mass. Due to this comparatively higher zirconia content, it is expected that this product will have a comparatively lower resistance to slags high in FeO than the product according to exemplary embodiment 1.

At the same time, the production of this product was associated with the economic disadvantage that the provision of the zirconia grains was considerably more expensive than the provision of the coated grains in accordance with the invention.

Comparative Example 2

In order to determine the influence of the grain size of coated grains on the microstructural elasticity of a sintered refractory product produced using such coated grains, two sintered refractory products were produced for comparison purposes, which differed from the product produced according to the exemplary embodiment solely in that the grain size of the coated grains was less than 2.8 mm.

According to the product according to comparative example 2, the coated grains were provided with a grain size in the range of 0.85 to 2.8 mm.

The product according to comparative example 2 then had a modulus of elasticity of 100.6 GPa.

According to the comparative example 2, the modulus of elasticity of the products was significantly higher than the modulus of elasticity according to the product of the exemplary embodiment 1 in accordance with the invention, which indicates a significantly lower structural elasticity.

EXEMPLARY EMBODIMENT 2

Example Process for the Production of Coated Grains

Grains of doloma, with grain sizes ranging from 2.80 to 6.63 mm, were first provided for the execution of the process.

The doloma grains had the following chemical composition, relative to the total mass of the doloma grains:
MgO: 39.8% by mass
CaO: 58.2% by mass
$Fe_2O_3$: 0.8% by mass
$Al_2O_3$: 0.5% by mass
$SiO_2$: 0.7% by mass
$Mn_2O_3$: 0.0% by mass A zirconia powder was also provided. The zirconia powder had the chemical composition and grain size according to exemplary embodiment 1.

To provide a zirconia layer on the doloma grains, the doloma grains were treated like the magnesia grains according to exemplary embodiment 1. Accordingly, zirconia coated doloma grains having a mass ratio of 80% by mass doloma to 20% by mass zirconia and further having a thickness of the zirconia coating on the doloma grains of about 150-500 µm were provided.

Example of the Coated Grains

The previously described example of a process for the production of coated grains resulted in coated grains of doloma, the surface of which was completely coated with a zirconia coating. At the 150-500 µm thickness of the zirconia coating obtained, the mass fraction of the zirconia coating was about 20% by mass, relative to the total mass of the coated grains. In other words, the process produced coated grains that had a core of doloma and were completely coated on their surface with a zirconia coating. The mass ratio of this core to the coating was 80% by mass to 20% by mass.

Example of a Batch

An exemplary embodiment of a batch according to the invention was produced, which included the coated grains according to the above exemplary embodiment.

These coated grains were mixed with a refractory base material, bonding clay and a binding agent to form a batch.

The refractory base material consisted exclusively of basic components in the form of sinter doloma and sinter magnesia. The sinter doloma and the sinter magnesia were each provided with grain sizes in the range of >0 to 6.63 mm.

The binder was in the form of a temporary organic binder in the form of a non-aqueous organic binder.

The components, with the exception of the binder, were put into a mixer in the following proportions by mass, in each case relative to the total mass of the batch, to form a batch:
Coated grains: 4% by mass
Doloma: 86.1% by mass
Magnesia: 9.5% by mass
Bonding clay: 0.4% by mass.

Subsequently, the binder was added to the batch in a proportion of 1.8% by mass, based on the batch without the binder.

The components were then mixed in the mixer to form a batch.

Example of a Process for the Production of a Sintered Refractory Product

The process was carried out according to exemplary embodiment 1.

Accordingly, after firing, the product was in the form of a sintered refractory according to the invention.

This product had the first sintered grains in the form of grains of sintered doloma and sintered magnesia. These first grains were formed from the grains of the components of the refractory base material.

There were also second grains in the product which had formed from the coated grains. These second grains were in the form of grains of doloma, each with a coating of calcium zirconate. The thickness of this calcium zirconate coating was somewhat larger than the thickness of the zirconia coating on the coated grains, i.e. about 200-600 µm.

The microstructure of the sintered refractory product had a matrix of sintered first grains in which the second grains were embedded.

The modulus of elasticity of the product was determined to be 96.4 GPa.

At the same time, the chemical content of $ZrO_2$ in the product was 0.8% by mass, relative to the total mass of the product. This is expected to result in good resistance to slags rich in FeO of the product.

Comparative Example

Comparative Example 3

For the purposes of comparison, a sintered refractory product was produced which differed from the product produced according to the exemplary embodiment 2 in that the coated grains were replaced by zirconia grains which had the grain size in the range from 2.80 to 6.63 mm, and wherein the product was made from the following batch:
Zirconia grains: 0.87% by mass
Doloma: 89.23% by mass
Magnesia: 9.5% by mass
Bonding clay: 0.4% by mass.

The sintered refractory product obtained had only a modulus of elasticity of 102.0 GPa. However, this product had a chemical zirconia content of 0.9% by mass. Due to this comparatively higher zirconia content, it is expected that this product will have a comparatively lower resistance to slags high in FeO than the product according to exemplary embodiment 2.

At the same time, the production of this product was associated with the economic disadvantage that the provision of the zirconia grains was considerably more expensive than the provision of the coated grains in accordance with the invention.

FIGURES

Scanning electron microscope images of sections of the sintered refractory product produced according to the exemplary embodiment were made.

Two of these images are shown in the attached figures.

Figure 2:
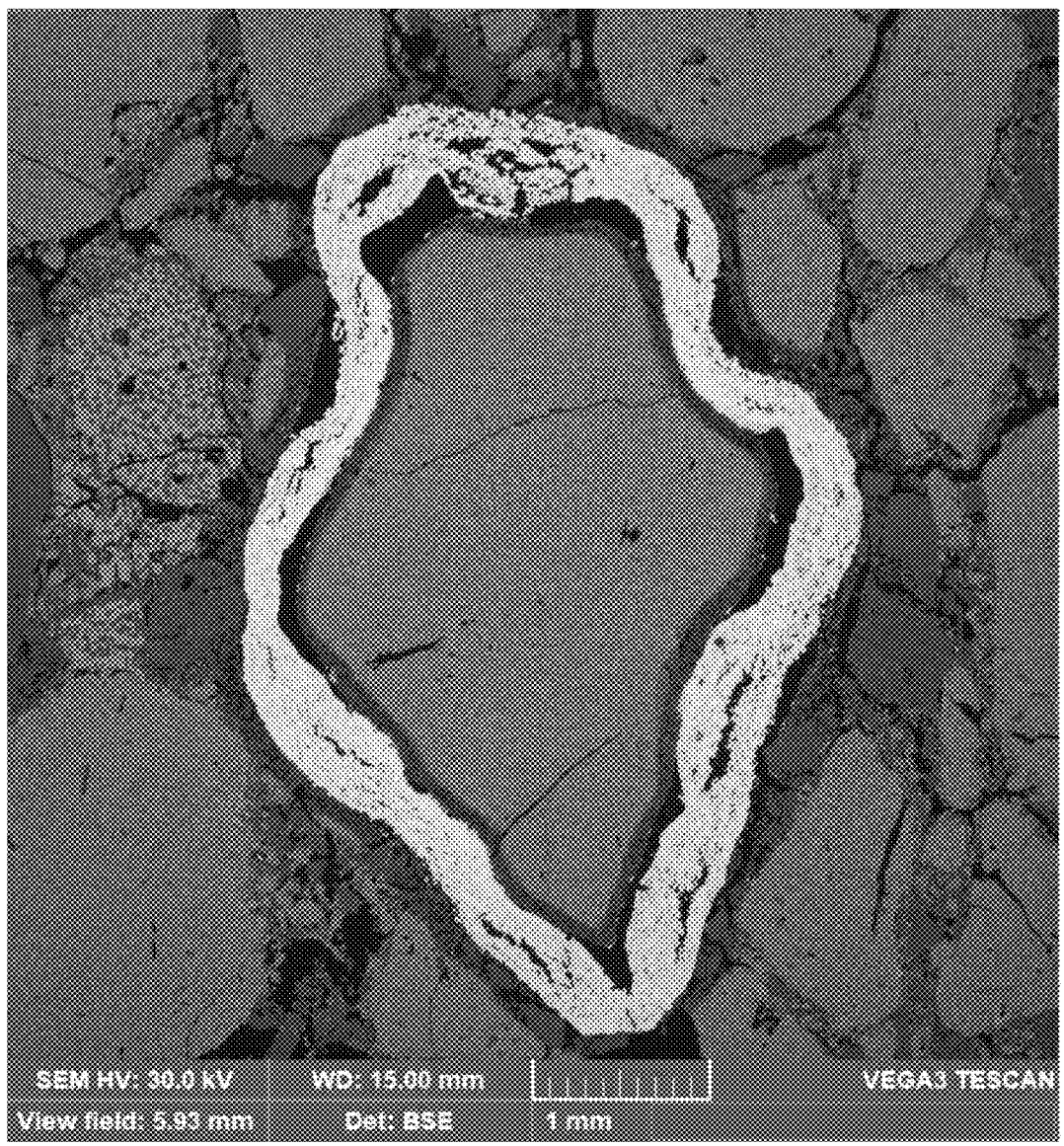

FIG. 1 shows a scanning electron microscope image of an area of the sintered refractory product according to the exemplary embodiment 1 and FIG. 2 shows another scanning electron microscope image of an area of the sintered refractory product according to the exemplary embodiment 2.

In FIGS. 1 and 2, a white scale at the bottom indicates a length of 1 mm. It should be noted in this respect that the second grains shown in FIGS. 1 and 2 each have an average grain size of more than 2.8 mm. As far as the grains appear to have a smaller average grain size than 2.8 mm in FIGS. 1 and 2, this is due to the fact that the grains have a longitudinal extension away from the cutting plane.

FIGS. 1 and 2 show a second grain each in a sintered refractory product according to the respective exemplary embodiments.

FIG. 1 shows a second grain of magnesia coated with calcium zirconate. The calcium zirconate coating appears as a light area surrounding a darker area. The darker area represents the grain of magnesia, i.e. the "core" of magnesia. The second grain shown in Figure is embedded in a matrix of sintered first grains of sintered doloma and sintered magnesia which surround the outer light area of calcium zirconate.

FIG. 2 shows a second grain of doloma coated with calcium zirconate. The calcium zirconate coating appears as a light area surrounding a darker area. The darker area represents the grain of doloma, i.e. the "core" of doloma. The second grain shown in FIG. 2 is embedded in a matrix of sintered first grains of sintered doloma and sintered magnesia which surround the outer light area of calcium zirconate.

What is claimed is:

1. Grains for the production of a sintered refractory product, the grains for the production of the sintered refractory product comprising the following features:
   1.1 the grains for the production of the sintered refractory product are made of at least one of the following grains:
      1.1.1 grains made of magnesia, the surface of which have a coating of zirconia at least in sections; or
      1.1.2 grains made of magnesite, the surface of which have a coating of zirconia at least in sections; or
      1.1.3 grains made of doloma, the surface of which have a coating of zirconia at least in sections; or
      1.1.4 grains made of dolomite, the surface of which have a coating of zirconia at least in sections;
   1.2 the grains for the production of the sintered refractory product have a grain size of at least 2.8 mm;
   1.3 wherein the proportion by weight of the coating of zirconia, in relation to the total weight of the grains for the production of the sintered refractory product, is in the range from 1 to 50% by weight.
2. The grains for the production of the sintered refractory product according to claim 1, wherein the grains for the production of the sintered refractory product have a grain size in the range from 2.8 to 8.0 mm.

3. The grains for the production of the sintered refractory product according to claim 1, wherein the coating of zirconia has a thickness of at least 10 μm.

4. The grains for the production of the sintered refractory product according to claim 1, wherein the coating of zirconia has a thickness in the range from 10 to 800 μm.

5. A batch for the production of a sintered refractory product, the batch comprising grains for the production of the sintered refractory product, the grains for the production of the sintered refractory product comprising the following features:
- 6.1 the grains for the production of the sintered refractory product are made of at least one of the following grains:
  - 6.1.1 grains made of magnesia, the surface of which have a coating of zirconia at least in sections; or
  - 6.1.2 grains made of magnesite, the surface of which have a coating of zirconia at least in sections; or
  - 6.1.3 grains made of doloma, the surface of which have a coating of zirconia at least in sections; or
  - 6.1.4 grains made of dolomite, the surface of which have a coating of zirconia at least in sections;
- 6.2 the grains for the production of the sintered refractory product, comprised by the batch, have a grain size of at least 2.8 mm;
- 6.3 wherein the proportion by weight of the coating of zirconia, in relation to the total weight of the grains for the production of the sintered refractory product comprised by the batch, is in the range from 1 to 50% by weight.

6. The batch according to claim 5, comprising at least 1% by weight of the grains for the production of the sintered refractory product comprised by the batch, in relation to the total weight of the batch.

7. The batch according to claim 5, comprising 1 to 15% by weight of the grains for the production of the sintered refractory product comprised by the batch, in relation to the total weight of the batch.

8. The batch according to claim 5, comprising at least one calcium oxide comprising component.

9. The batch according to claim 8, wherein the at least one calcium oxide comprising component is at least one of the following calcium oxide comprising components: Doloma or dolomite.

10. The batch according to claim 8, wherein the at least one calcium oxide comprising component is present in the form of grains.

11. The batch according to claim 5, wherein the batch is a batch for the production of a sintered refractory dolomite product.

12. The batch according to claim 5, wherein the batch has a chemical composition with MgO in the range from 38 to 90% by mass and with CaO in the range from 8 to 60, the remainder being $ZrO_2$, $SiO_2$, $Fe_2O_3$, and $Al_2O_3$.

13. A process for the production of a sintered refractory product, the process comprising the following steps:
- 14.1 providing a batch, the batch comprising grains for the production of the sintered refractory product, the grains for the production of the sintered refractory product comprising the following features:
  - 14.1.1 the grains for the production of the sintered refractory product are made of at least one of the following:
    - 14.1.1.1 grains made of magnesia, the surface of which have a coating of zirconia at least in sections; or
    - 14.1.1.2 grains made of magnesite, the surface of which have a coating of zirconia at least in sections; or
    - 14.1.1.3 grains made of doloma, the surface of which have a coating of zirconia at least in sections; or
    - 14.1.1.4 grains made of dolomite, the surface of which have a coating of zirconia at least in sections;
  - 14.1.2 the grains for the production of the sintered refractory product comprised by the batch have a grain size of at least 2.8 mm;
  - 14.1.3 wherein the proportion by weight of the coating of zirconia, in relation to the total weight of the grains for the production of the sintered refractory product comprised by the batch, is in the range from 1 to 50% by weight;
- 14.2 firing the batch to produce a sintered refractory product.

14. A sintered refractory product, the product comprising the following features:
- 15.1 the product comprises grains, which are sintered together;
- 15.2 the grains comprise first grains and second grains, wherein
- 15.3 the first grains comprise a subset of grains that comprise calcium oxide, wherein
- 15.4 the second grains are at least one of the following:
  - 15.4.1 magnesia grains, the surface of which have a coating of calcium zirconate at least in sections; or
  - 15.4.2 magnesite grains, the surface of which have a coating of calcium zirconate at least in sections; or
  - 15.4.3 doloma grains, the surface of which have a coating of calcium zirconate at least in sections; or
  - 15.4.4 dolomite grains, the surface of which have a coating of calcium zirconate at least in sections; and wherein
- 15.5 the second grains have a grain size of at least 2.8 mm;
- 15.6 the proportion by weight of the coating of zirconia, in relation to the total weight of the second grains, is in the range from 1 to 50% by weight.

* * * * *